Nov. 7, 1961

R. BOK 3,007,382

FILM CONVEYING DEVICE FOR A MIRROR CAMERA

Filed Feb. 4, 1957

INVENTOR.
R. BOK

BY

Nov. 7, 1961  R. BOK  3,007,382
FILM CONVEYING DEVICE FOR A MIRROR CAMERA
Filed Feb. 4, 1957  4 Sheets-Sheet 2

INVENTOR.
R. BOK
BY

Nov. 7, 1961 R. BOK 3,007,382
FILM CONVEYING DEVICE FOR A MIRROR CAMERA
Filed Feb. 4, 1957 4 Sheets-Sheet 3

INVENTOR
R. BOK

BY *Henderson, Lind & Ponack*
ATTYS.

Nov. 7, 1961 R. BOK 3,007,382
FILM CONVEYING DEVICE FOR A MIRROR CAMERA
Filed Feb. 4, 1957 4 Sheets-Sheet 4

*INVENTOR.*
R. BOK
BY

United States Patent Office 3,007,382
Patented Nov. 7, 1961

3,007,382
FILM CONVEYING DEVICE FOR A
MIRROR CAMERA
Roelof Bok, Bremarscheweg 204, Hengelo, Netherlands
Filed Feb. 4, 1957, Ser. No. 638,152
Claims priority, application Netherlands Feb. 6, 1956
4 Claims. (Cl. 95—11)

The invention relates to a device for conveying separate pieces of film to and from the image area in a mirror type camera, and more specifically to a device comprising a frame having two parallel guiding grooves extending transversely through the camera for guiding the edges of the films during conveying, an image window situated in the image area, and a pressing pad for pressing the films against the image window during exposure.

It is one object of the invention to provide a device of the type referred to, which is adapted for low as well as for high exposure repetition rates of the camera. Another object is to provide a conveying device in which the pieces of film are transferred to and from the image window in a compulsory manner in order to avoid any uncertainty in the taking of pictures. A still further object is to minimize the amount of light travelling towards the camera mirror which is intercepted by the film conveying device.

These and other objects may be obtained, according to the invention by providing the conveying device with two endless conveying bands, arranged so as to be driven slip-free and intermittently along the guiding grooves, said bands being provided with transverse projections engaging the back edges of the films for moving them through the guiding grooves. In certain cases where high conveying speeds are essential, further projections may be provided on the bands, spaced apart from the projections previously mentioned and preventing further movements of the films when the bands are suddenly stopped. Thus, independent of the conveying speed the films will be always stopped at the right location between the image window and the pressing pad.

Particulars of the device according to the invention are given in the following description of some embodiments with reference to the drawings in which:

FIGS. 7 and 8 are longitudinal sectional views of parts of the device illustrated in FIG. 5, whereas

Figures 1, 4:
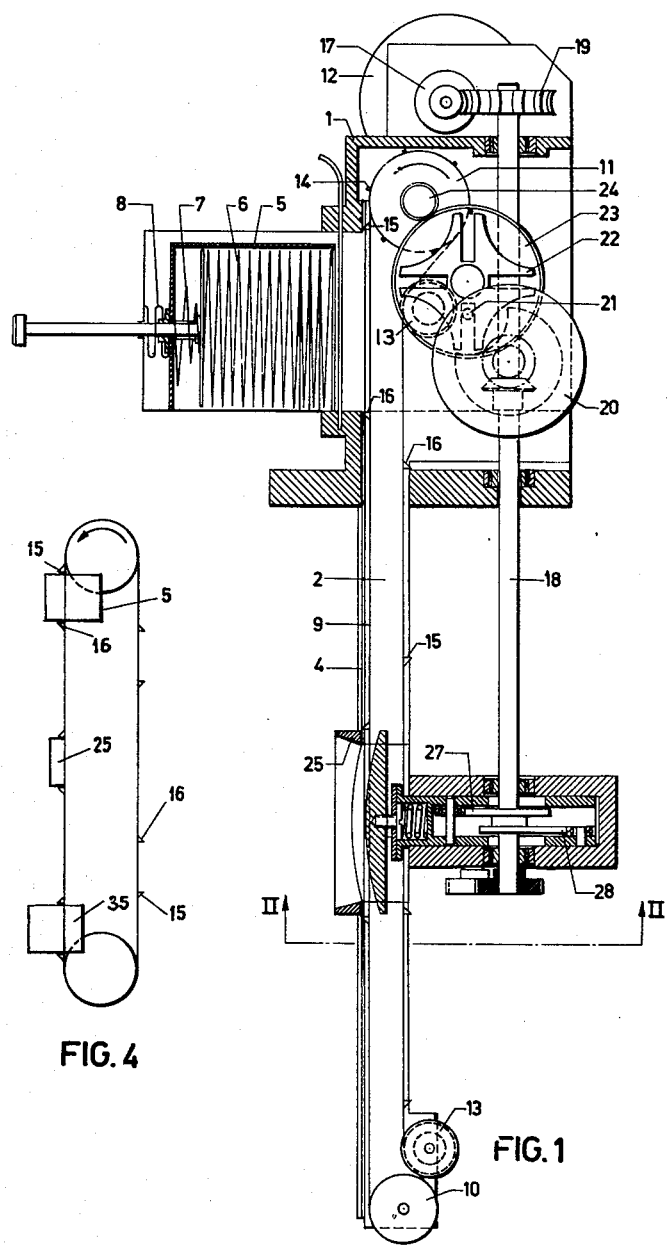
FIG. 1 is a longitudinal sectional view of a conveying device according to the invention.
FIG. 4 is a diagrammatical view of one of the conveying bands of the device.

The device shown in FIG. 1 comprises a frame 1, having two parallel guiding bars 2, 3 which extend transversely through the camera housing, when the device is mounted therein. Both bars are provided with a guiding groove 4 for the edges of the pieces of film which are fed from a supply magazine 5. The pieces of film in the magazine are in the embodiment separated by a spacer 6 e.g. of cardboard which has been folded zigzag. In the magazine a spring 7 is provided for compressing the stack of films together with the spacer 6, whereas the spring 8 tends to shift the supply magazine itself to the right.

The pieces of film have a width at least slightly greater than the spacer 6 such that the foremost film is always pressed under the action of spring 7 to the bars 2 and 3 and is engaged with its edges by shoulders on these bars which are positioned in line with the guiding grooves 4.

In or adjacent the frame bars on both sides of the supply magazine 6 an endless conveying band 9 made of steel, phosphorbronze or any other suitable material having a small ductility, such as plastic, is guided over rollers 10 and 11, the rollers 10 being driven by an electric motor 12 through a driving mechanism further explained hereinafter.

In order to prevent slipping of the conveying bands 9 with respect to the rollers 11 the bands are provided with regularly spaced holes cooperating with projections 14 on the rollers 11. Each of the conveying bands is provided with a number of projections 15 engaging the hind edges of the films and pushing the latter along the parallel bars 2 and 3, and a number of projections 16 preventing the films from coasting when the bands are stopped. The projections 15 are of such a height that only one piece of film can be taken out of the supply magazine 5 and carried away at a time, suitable distances between the subsequent films being secured by the spacer 6. Of course this spacer has dimensions selected so as to allow the projections 15 to pass freely on both sides of it.

Motor 12 drives a worm 17 cogging into a wormwheel 19 mounted on shaft 18. This shaft is through a conical gearing coupled to a wheel 20 having a pin 21 which drives a Maltese cross 22. The latter is connected to a gear wheel 23 engaging a gear wheel 24 which is mounted on a shaft bearing the driving rollers 11 for the conveying bands 9, which, in the arrangement illustrated, are each provided with four projections 15 for picking up the films and four projections 16 for stopping them. By this the conveying bands 9 are driven in such a way that the pieces of film are transferred from the supply magazine to an image window 25, then stopped in order that the exposure may take place and again transferred from this window to a chamber receiving the exposed pieces of film. In this chamber, which is not shown in the drawing, the films may be packed loosely. If one wishes, however, to put the exposed pieces of film into a regular take-up magazine 35 (FIG. 4), in which the films may be placed in the order of successive exposures between separating walls, each piece of film must be displaced by the conveying bands in a compulsory manner when leaving the film window. Therefore, the bands 9 must be provided with five projections 15 for taking up and five projections 16 for stopping the film respectively, whereas the take-up magazine must be displaced by a driving device a small distance in the direction indicated by the arrow in FIG. 4, each time it has received a film. Such driving devices may be of any known type and are not described in detail here. When a piece of film is carried along by the conveying bands 9 its edges are continuously guided by the guiding grooves 4. These grooves may be made relatively narrow without entailing any risk of gripping of the films in the guiding grooves.

Figure 3:
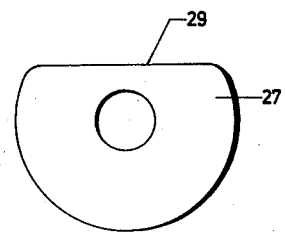
FIG. 3 is a view of a cam operating the pressing pad when pressing the film against the image window.

When a piece of film has been put behind the image window 25 it is given the required curvature in a manner known in itself by means of a pressing pad 26 having the same convex shape as the image surface. The required alternating movement of the pressing pad is derived from a set of two cams 27 and 28 driven by the shaft 18. The cams are arranged on a shaft running parallel to shaft 18 and are provided with flattenings 29 (FIG. 3) of such a shape that the pressing pad is first moved to the left by the cam 27, then remains for a while in its outermost position and is finally returned by cam 28 to the position shown in the drawing. All movements occur within the period during which the conveying bands are at a standstill. In order to avoid the risk that the edges of the film are pressed out of the guiding grooves 4 by the pressing pad 26, the guiding groove walls are interrupted on one side and two strips 30, 31 are hingedly mounted on the bars 2 and 3 and are held in horizontal position under the action of spring 32, 33.

Figure 2:
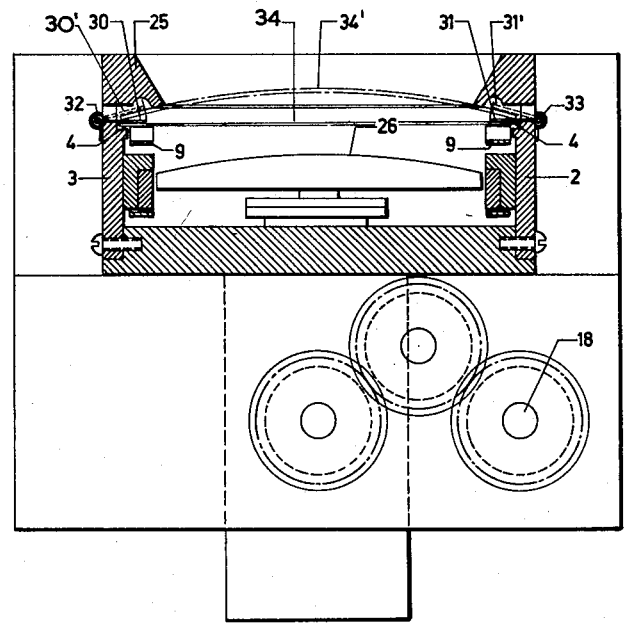
FIG. 2 is a cross sectional view of the image window along the line II—II in FIG. 1.

While the pressing pad 26 is pressing the piece of film against the image window 25, this film will be positioned as indicated in dotted lines 34' in FIG. 2, its edges thereby having rotated the strips 30 and 31 against the action of springs 32 and 33 into the positions indicated by references 30' and 31'. When the pressing pad 26 is returned by the cam 28 allowing the film 34 to straighten, the strips 30 and 31 push the side edges of the film back into their original plane in which they are in line with the guiding grooves 4 in the bars 2, 3. So the piece of film is ready to be transferred to the receiving chamber or take-up magazine.

Figures 5, 6:
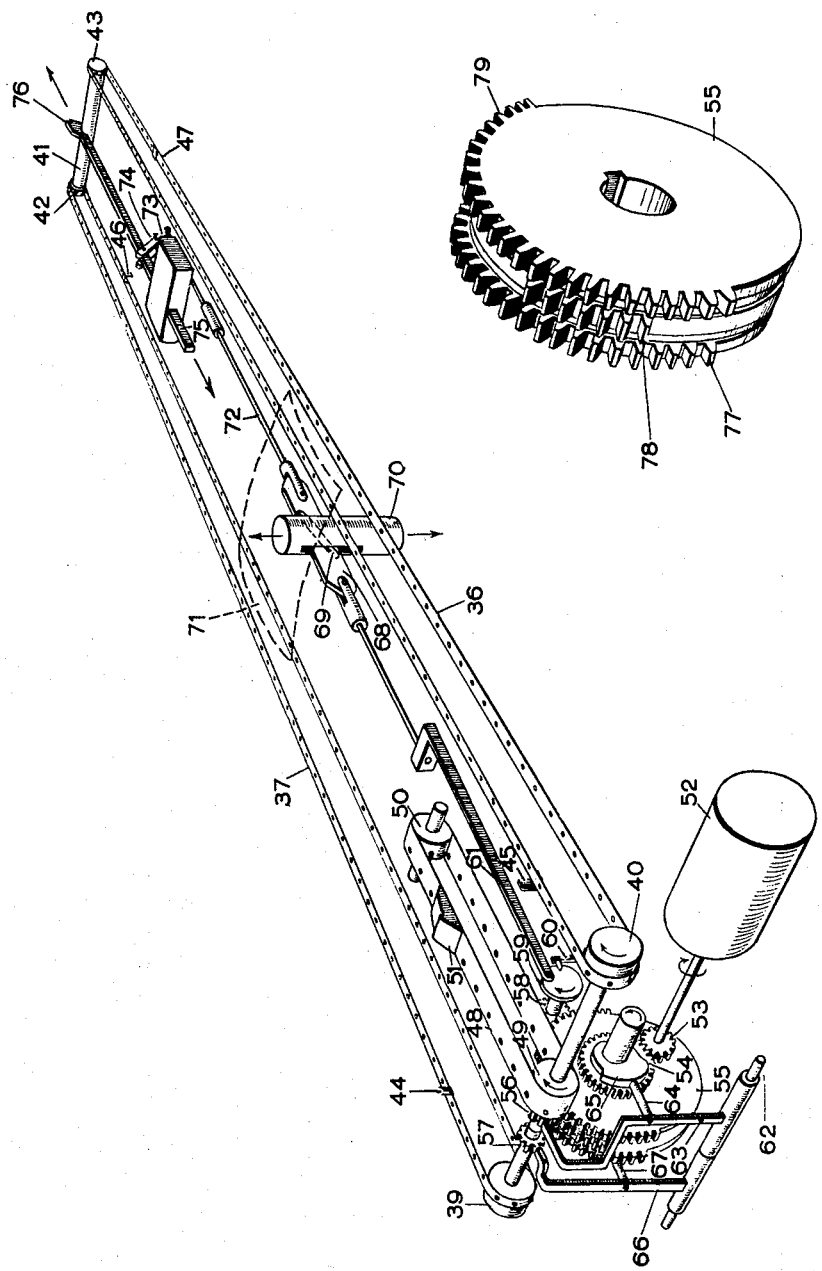
FIG. 5 is a perspective view of a modified conveying device according to the invention.
FIG. 6 is a perspective view of a gear wheel which may be incorporated in the driving mechanism of the device shown in FIG. 5.
Figure 9:
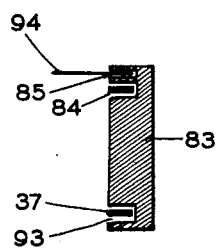
FIG. 9 shows a cross section of one of the guiding frame bars of the device taken along the line IX—IX in FIG. 7.

In the modified arrangement shown in perspective in FIG. 5 the perforated conveying bands 36 and 37 are driven by driving rollers 39 and 40 and guided by guiding rollers 42 and 43. For the sake of clarity all frame parts including two grooved bars crossing the camera housing in which the films are guided during the transfer have been eliminated from the drawing. A cross sectional view of one of these bars, 83, is given in FIG. 9, however, to show the groove 85 for the film 94 and the grooves 84 and 93 in which the endless band 37 is embedded.

Figure 7:
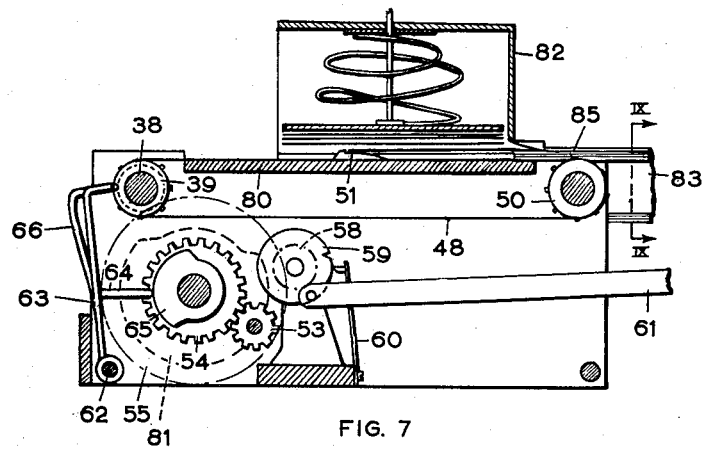

The embodiment illustrated in FIG. 5 differs from the arrangement of FIGS. 1–4 first with respect to the manner in which the pieces of film are picked-up one by one from the supply magazine by the conveying bands. To this purpose in the embodiment of FIG. 5 a separate endless band 48 is mounted between the conveying bands 36, 37 at the supply end of the device. The band 48 is provided with a nose 51 adapted to be passed underneath a supply magazine and to shift the lowermost one of the films stacked therein until it is out of the magazine and may be taken over by one pair of the extensions 44—47 of the conveying bands 36 and 37. The position of the supply magazine with respect to the endless band 48 may be seen best from FIG. 7, in which a magazine 82 is shown in cross section. The magazine which is only partly illustrated contains a number of stacked films pressed towards the bottom of the magazine by a spring. In this bottom which is placed on a support plate 80 a slot is provided allowing the band 48 with its nose 51 to pass underneath the magazine. Preferably a special sharp edge is provided on top of the nose 51 which, upon meeting the hind edge of the lowermost film shifts this film to the right, the height of the edge being less than the thickness of one film. Further films are positively prevented from being carried along together with the lowermost film e.g. by friction, due to the fact that the height of the slot between the back wall of the magazine and its bottom is only slightly larger than the thickness of one film. Behind the slot the entrance part 85 of the guiding grooves receive the edges of the film, so that the latter may be moved further by the projections such as 44, 45 of the conveying bands.

The driving roller 49 of the band 48 is rotatably mounted on a shaft 38 on which the driving rollers 39 and 40 of the conveying bands 36, 37, respectively, are fixed. The intermittent shifts of the bands 36, 37 and 48, as well as the alternating movements of the pressing pad 71 (shown in FIG. 5 in dotted lines) are derived from a common gear wheel 55 which is driven by a motor 52 through a pair of gear wheels 53, 54 and is provided with three rims as shown in greater detail in FIG. 6. The rims cover different parts of the circumference of the wheel 55, which may also have different diameters for the three rims. Thus the gear wheel 57 for the rollers 39, 40, the gear wheel 56 fixed to the roller 49 and the gear wheel 58 connected to the operating means for the pressing pad 71, are rotated step-wise in the course of one revolution of the gear wheel 55 in a strictly coordinated manner. In order to ensure that the interrelated positions of the bands 36, 37 and 48 are correctly maintained during the working, pawls 63, 66 are provided, which are brought into engagement with the gear wheels 56 and 57 respectively under the action of springs (not shown) unless they are lifted by fingers 64 and 67 cooperating with cams 65 and 81 (FIG. 7) respectively. The phase of the movements of the pressing pad 71 with respect to those of the various bands is correctly maintained by means of a pawl 60 which snaps into a notch of the disk 59 each time the latter has made one complete revolution. The pawl is fixed to a blade spring allowing it to release the disk 59 for a next revolution as soon as the corresponding rim of teeth on the wheel 55 engages the gear wheel 58.

The disk 59 is pivotable connected to a connecting rod arrangement 61 which in turn is connected to the slide 68 which is received by a slot in the cylindrical bar 70 bearing the pressing pad 71. The slide 68 is provided with a sloping slot 69 and is guided by horizontal surfaces of the frame not shown so that it can only be moved horizontally. A pin fixed to the bar 70 and extending through the slot 69 moves the bar 70 up and down when the slide 68 is shifted to the right or to the left respectively by the connecting rod 61. A take-up magazine 87 for the film is provided at the end of the device and may be seen best from FIG. 8. In the magazine the films 86 are received between a guiding wall 88 which is stationary and the pressing plate 89, which is pressed onto the wall 88 by a spring 90. The films approaching the magazine while being guided by the grooves, such as groove 85, in the frame bars such as 83, are inserted between the wall 88 and the plate 89 of the magazine by a rammer 75, which is operated by the connecting rod 72 attached to the slide 68 in the following manner.

When the pressing pad 71 is retracted by the slide 68 the latter moves connecting rod 72 to the right and the lever 73 which is at 74 pivotally connected to a frame part 84 is rotated anti-clockwise, thereby retracting the rammer 75 to the left. Then the conveying bands 36, 37 are re-started and the exposed film is conveyed from the image window to the entrance of the take-up magazine. While the edges of the film are retained by the guiding grooves, as 85, its middle part is lifted a small distance by the nose 76 of the rammer 75 so that it can pass over this nose. After that the film re-assumes its flat shape and has its front edge inserted between wall 88 and pressure plate 89 of the take-up magazine. The conveying bands 36, 37 are running along until the next unexposed film has arrived in the space behind the image window. Then the conveying bands are stopped and the pressing pad 71 is moved upwards by the slide 68. The connecting rod 72 rotates lever 73 clockwise thereby pushing the rammer 75 to the right. The hind edge of the film is engaged by the nose 76 of the rammer and the film is fully inserted between the wall 88 and the plate 89.

Figure 8:
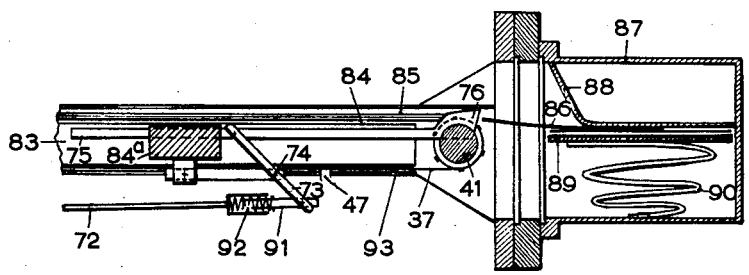

As may be seen in FIG. 8 between the connecting rod 72 and the lever 73 a coiled spring 92 is mounted in order to avoid damage when the nose 76 collides with the plate 89 or other parts appearing in its course.

It will be apparent that the scope of the following claims is not intended to be restricted to the specific embodiments shown in the drawings and explained hereinbefore and that many modifications may be made therein without leaving the domain of the invention.

What I claim is:

1. A device for conveying an individual film to and from the image area in a mirror camera, comprising a frame having two parallel guiding grooves extending transversely through the camera for guiding the edges of a film during conveying, an arc shaped image window located in said image area, an arc shaped pressing pad for pressing a film against said image window during exposure thereof, means for conveying a film through said parallel guiding grooves comprising two endless bands mounted on said frame, means for driving said bands intermittently along said guiding grooves, projections on said bands engaging the back edge of a film for moving it through said parallel guiding grooves, the walls on one side of said parallel guiding grooves being cut away at said image window and spring urged strips movably mounted in said frame which are displaced by the displaced edges of the film when the latter is pressed against said image window by said pad and return the film to the plane of the guiding grooves after exposure under the action of said springs.

2. In a photographic camera having a concave mirror objective whose arcuate focal surface is on the camera axis in front of said mirror, a photographic film loading and discharging device comprising an image window on the camera axis in said focal surface, a pressing plate for pressing a cut film against said image window during exposure thereof, a frame including two parallel spaced bars extending transversely through the interior of the camera and supporting said image window, said bars having longitudinal parallel grooves to guide the edges of a cut film during movement of such film, means for inserting cut films individually into said parallel guiding grooves at the supply end of the grooves, and means for conveying such cut films along the length of the grooves comprising a pair of endless bands intermittently movable in the space between and adjacent said parallel bars, each of said bands having projections thereon to engage an individual cut film after insertion into said grooves and to carry it to and from said image window, the distances between subsequent corresponding projections on said endless bands exceeding half the length of said grooves whereby no other cut film may be in the interior of the camera when a cut film is in the exposure position at the image window.

3. In a photographic camera as claimed in claim 2 wherein there is provided a supply magazine adapted to receive a stack of cut films, a third endless band extending between said pair of endless bands at the supply end of the guiding grooves and movable in a plane parallel to the films in said stack, a spring in said supply magazine urging said stack of cut films towards said third band, a projection on said third band to engage individual cut films discharged from said supply magazine and to insert such films into said guiding grooves into a position so as to be engaged by said projections on said pair of endless bands.

4. In a photographic camera as claimed in claim 2 wherein there is provided a take-up magazine for the exposed cut films at the end of said parallel guiding grooves opposite the supply end, a pushing rod mounted between said parallel bars slidable in parallel relation to said pair of endless bands, said rod having a nose thereon to engage the back-edge of a cut film after the latter has been passed over it by said pair of endless bands and means for reciprocably moving said pushing rod in timed relation with said intermittent movement of said pair of endless bands to thereby shift such cut film out of the grooves and insert same into said take-up magazine.

References Cited in the file of this patent
UNITED STATES PATENTS

| | | |
|---|---|---|
| 1,653,408 | Olson | Dec. 20, 1927 |
| 1,970,381 | Landrock | Aug. 14, 1934 |
| 2,049,041 | Berggren | July 28, 1936 |
| 2,731,893 | Kling | Jan. 24, 1956 |

FOREIGN PATENTS

| | | |
|---|---|---|
| 50,349 | Sweden | Nov. 16, 1921 |